United States Patent
Tran et al.

(10) Patent No.: US 9,774,654 B2
(45) Date of Patent: Sep. 26, 2017

(54) SERVICE CALL GRAPHS FOR WEBSITE PERFORMANCE

(71) Applicant: LinkedIn Corporation, Mountain View, CA (US)

(72) Inventors: Cuong Tran, Los Altos, CA (US); Badrinath Sridharan, Saratoga, CA (US); Christopher Coleman, Sunnyvale, CA (US); Toon Sripatanaskul, Menlo Park, CA (US); Thomas Goetze, Danville, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 227 days.

(21) Appl. No.: 14/611,847

(22) Filed: Feb. 2, 2015

(65) Prior Publication Data
US 2016/0226736 A1   Aug. 4, 2016

(51) Int. Cl.
| G06F 15/173 | (2006.01) |
| H04L 29/08 | (2006.01) |
| G06F 17/30 | (2006.01) |

(52) U.S. Cl.
CPC ...... H04L 67/025 (2013.01); G06F 17/30958 (2013.01)

(58) Field of Classification Search
USPC .................................. 709/224; 707/754, 737
See application file for complete search history.

(56) References Cited

U.S. PATENT DOCUMENTS

| 6,003,079 | A | 12/1999 | Friedrich | |
| 6,711,137 | B1 | 3/2004 | Klassen | |
| 7,116,639 | B1 | 10/2006 | Gail | |
| 7,562,065 | B2 | 7/2009 | Chavda | |
| 7,730,460 | B1* | 6/2010 | Warren | G06F 11/323 717/130 |
| 8,560,504 | B2* | 10/2013 | Parker | G06F 17/3089 707/634 |

(Continued)

OTHER PUBLICATIONS

Sigelman et al., "Dapper, a Large-Scale Distributed Systems Tracuing Infrastructure", Google Technical Report dapper—Jan. 2010, Apr. 2010, 14 pages.

(Continued)

*Primary Examiner* — Tammy Nguyen
(74) *Attorney, Agent, or Firm* — Hickman Palermo Becker Bingham LLP; Daniel D. Ledesma

(57) ABSTRACT

Techniques for generating, storing, and using service call graphs are provided. In one technique, trace data items generated by different services are correlated to generate a service call graph. Trace data indicates when certain services are called and their respective latencies as a result of a client request. A service call graph may reflect a single trace or multiple traces over a particular period of time. A service call graph may be analyzed to inform administrators of a web site how a web application and the services it relies on are performing. A service call graph may be used to determine whether there are sufficient resources to support a projected increase in traffic to a web application. A service call graph may be used to estimate a cost of a web application. Multiple service call graphs may be compared to determine one or more root causes of a performance problem.

22 Claims, 7 Drawing Sheets

(56) References Cited

U.S. PATENT DOCUMENTS

| | | | | |
|---|---|---|---|---|
| 8,799,852 B2* | 8/2014 | Shah | | G06F 8/34 |
| | | | | 705/51 |
| 8,990,792 B2* | 3/2015 | Gorelkina | | G06F 11/3612 |
| | | | | 717/133 |
| 9,021,451 B2* | 4/2015 | Park | | G06F 11/3612 |
| | | | | 717/132 |
| 9,330,051 B1 | 5/2016 | Martin | | G06F 15/173 |
| 9,450,849 B1* | 9/2016 | Goldberg | | H04L 43/0876 |
| 2002/0169860 A1* | 11/2002 | Duggan | | H04L 29/06 |
| | | | | 709/223 |
| 2003/0189499 A1 | 10/2003 | Stricklin | | |
| 2004/0199646 A1 | 10/2004 | Susai | | |
| 2005/0018611 A1 | 1/2005 | Chan | | |
| 2006/0036405 A1* | 2/2006 | Byrd | | G06N 5/022 |
| | | | | 702/186 |
| 2006/0036579 A1* | 2/2006 | Byrd | | G06Q 30/06 |
| 2006/0037022 A1* | 2/2006 | Byrd | | G06Q 10/063 |
| | | | | 718/104 |
| 2006/0047805 A1* | 3/2006 | Byrd | | G06F 11/3495 |
| | | | | 709/224 |
| 2006/0059118 A1* | 3/2006 | Byrd | | G06Q 10/10 |
| 2006/0245755 A1 | 11/2006 | Gumaste | | |
| 2007/0057952 A1 | 3/2007 | Swedberg | | |
| 2007/0083500 A1 | 4/2007 | Zibitsker | | |
| 2008/0037532 A1 | 2/2008 | Sykes | | |
| 2008/0235327 A1 | 9/2008 | Maes | | |
| 2009/0006071 A1 | 1/2009 | Dournov | | |
| 2009/0040937 A1 | 2/2009 | Xhafa | | |
| 2009/0070733 A1* | 3/2009 | Huang | | G06F 11/366 |
| | | | | 717/101 |
| 2009/0300073 A1 | 12/2009 | Bourbonnais | | |
| 2010/0088410 A1 | 4/2010 | Ridley | | |
| 2011/0080897 A1 | 4/2011 | Hernandez | | |
| 2011/0093253 A1 | 4/2011 | Kraft | | |
| 2011/0125921 A1 | 5/2011 | Karenos | | |
| 2011/0134804 A1 | 6/2011 | Maes | | |
| 2011/0145800 A1* | 6/2011 | Rao | | G06F 11/323 |
| | | | | 717/133 |
| 2011/0154300 A1* | 6/2011 | Rao | | G06F 11/3624 |
| | | | | 717/133 |
| 2011/0191088 A1 | 8/2011 | Hsu | | |
| 2012/0102474 A1* | 4/2012 | Artzi | | G06F 8/75 |
| | | | | 717/157 |
| 2012/0131129 A1 | 5/2012 | Agarwal | | |
| 2013/0006989 A1* | 1/2013 | Plattner | | G06F 17/30557 |
| | | | | 707/737 |
| 2013/0007024 A1* | 1/2013 | Plattner | | G06Q 10/08 |
| | | | | 707/754 |
| 2013/0007847 A1* | 1/2013 | Plattner | | G06Q 10/08 |
| | | | | 726/4 |
| 2013/0145463 A1* | 6/2013 | Ghosh | | G06F 21/56 |
| | | | | 726/22 |
| 2013/0308658 A1 | 11/2013 | Le Pallec | | |
| 2014/0040869 A1* | 2/2014 | Park | | G06F 11/3636 |
| | | | | 717/133 |
| 2015/0100971 A1 | 4/2015 | Dube | | |
| 2016/0225042 A1 | 8/2016 | Tran et al. | | |
| 2016/0225043 A1 | 8/2016 | Tran et al. | | |
| 2016/0226736 A1* | 8/2016 | Tran | | G06F 17/30958 |
| 2016/0226745 A1 | 8/2016 | Tran et al. | | |
| 2016/0283345 A1* | 9/2016 | Gounares | | G06F 17/00 |

OTHER PUBLICATIONS

U.S. Appl. No. 14/611,869, filed Feb. 2, 2015, Notice of Allowance, Nov. 25, 2016.

* cited by examiner

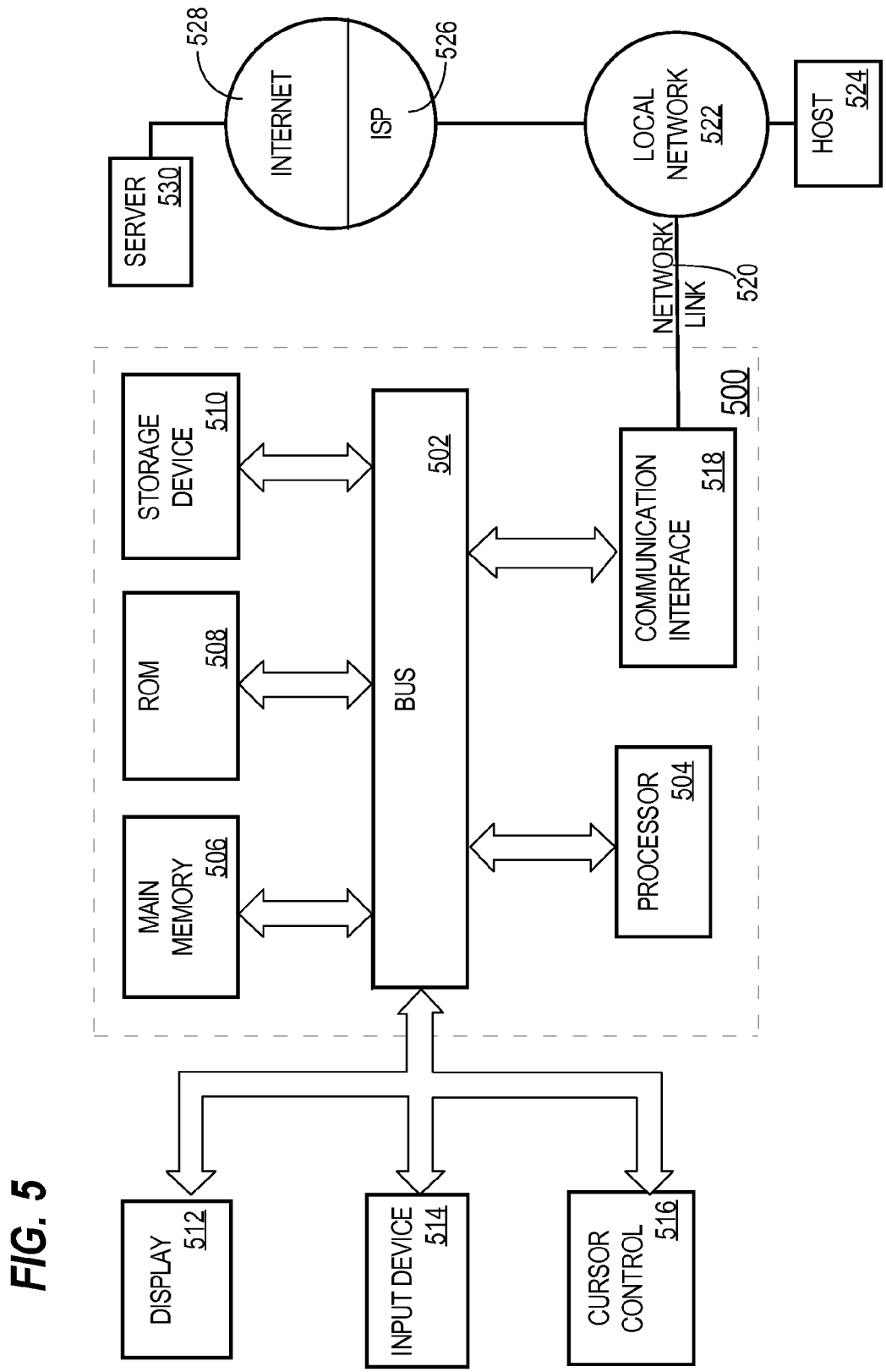

SERVICE CALL GRAPHS FOR WEBSITE PERFORMANCE

CROSS REFERENCE TO RELATED APPLICATIONS

This application is related to U.S. patent application Ser. Nos. 14/611,869, 14/611,855, and 14/611,918, each file Feb. 2,2015 and incorporated by reference as if fully disclosed herein.

FIELD OF THE DISCLOSURE

The present disclosure relates to generating service call graphs for web applications and analyzing website performance based on the service call graphs.

BACKGROUND

Some high traffic web sites serve millions of page views a minute. A single page view request may result in many calls to downstream services that span multiple backend tiers. Though web applications depend on downstream services, application developers typically have no insight on the relationships and performance of those services. This lack of insight poses a number of major challenges, such as performance optimization and root cause analysis.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 5 is a block diagram that illustrates a computer system upon which an embodiment of the invention may be implemented.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for generating a service call graph that indicates a relationship among services upon which a web application relies. Such services are referred to herein as "depended services" of the web application. A service call graph includes aggregated statistics, such as average latency of each call to a service. Such statistics may be used in performance analysis, root analysis, capacity planning, new web application planning, and estimating costs of various APIs, services, and web applications.

Service Call Graph

A "service call graph" is a directed graph that represents calling relationships between services of a web site. Each node in a service call graph (or "call graph") represents a service hosted at the web site. Each edge indicates an application programming interface (API) call from one service to another. The first (or "root" or "top") node in a call graph corresponds to a service (referred to herein as the "root service") that is called as the result of a request from a client of the web site. Example clients include a web browser client application and a mobile application (i.e., executing on a mobile device). The root service may be a service that is responsible for responding to the client request by calling one or more other services. Thus, the root service may call many services in response to receiving a client request.

Figure 1:
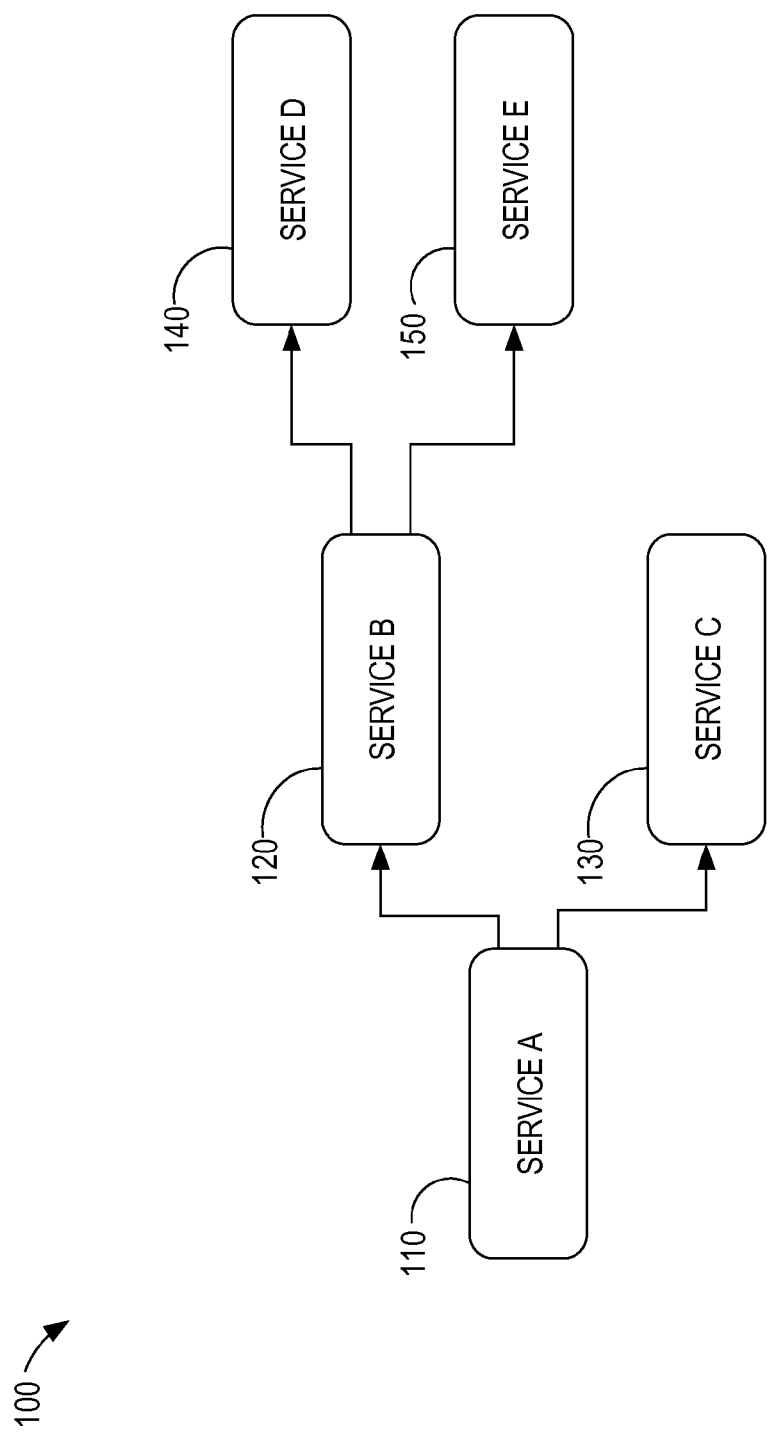
FIG. 1 is a block diagram that depicts an example service call graph, in an embodiment.

FIG. 1 is a block diagram that depicts an example call graph 100, in an embodiment. Call graph 100 includes a node 110 for service A, a node 120 for service B, a node 130, for service C, a node 140 for service D, and a node 150 for service E. Services A-E are depended services of a particular web application. Service A may be a front-end service that receives a request from a client device, such as a smartphone executing a mobile application that creates the request. (Alternatively, service A may be started by a batch job that calls service A.) In response to receiving the request, service A calls service B, which in turn (eventually) calls services D and E. Service A also calls service C.

A "downstream" service is one that is called by one or more other depended services. An "upstream" service is one that calls one or more other depended services. Services D and E are downstream services with respect to services A and B, while service C is a downstream service with respect to only service A. Conversely, service A is an upstream service of services B-E and service B is an upstream service of services D and E.

A call graph may include a cycle which indicates that a "downstream service" calls an "upstream service." Thus, due to a cycle, a service may be both an upstream service and a downstream service. However, the downstream service would call the upstream service with a different API, thus avoiding recursion.

A call graph may represent the result of processing a single client request. Alternatively, a call graph may represent the results of processing multiple client requests. Some client requests associated with a call graph may rely on a first set of services represented in the call graph while other client requests associated with the call graph may rely on a second set of services represented in the call graph, where the first set is different than the second set. For example, the first set may be all the services represented in the call graph and the second set may be a strict subset of all the services represented in the call graph. Referring to FIG. 1, one client request may involve using all services (i.e., services A-E) while another client request may involve using only service A, service B, service C, and service D.

In an embodiment where multiple call graphs are generated, each call graph may be associated with a different web application. A single web application may rely on one or more modules to generate and present data to a client. For example, one module may be a "people you may know" (PYMK) module that shows names of people that a member of a social network may know based on commonalities, such as attendance of the same university, membership in a particular group, or resident of the same city. The PYMK module may be just one of many features on a single web page (which is generated by a web application in response to a single client request). Also, the PYMK module may be used by different web applications.

Each of one or more nodes in a call graph may be associated with one or more data items. Example data items include total latency, wait time, and "self-latency." "Total latency" of a particular service refers to the entire time from when the particular service received a call until the particular service provided a final result of the call. "Wait time" of a particular service refers to the time that the particular service waits for one or more downstream services to complete processing the call(s) issued by the particular service. "Self-latency" of a particular service refers to the time that only the particular service spent on servicing a call and does not include the particular service's wait time. In other words, self-latency may be calculated as follows: self-latency=total latency−wait time.

The data of a call graph may be stored in file or in a table of a database (or in one or more other types of data objects) that lists each service that is called during the processing of a client request by a particular web application. For example, the table may include at least two columns: a column identifying upstream services that call a downstream service and a column identifying downstream services that are called by an upstream service. If multiple call graphs are stored in the table, then another column may store web application indicators, each of which is associated with a different web application. Additionally or alternatively, the table may include other columns for storing other information, such as the specific API that an upstream service uses to call a downstream service, average/total number of calls by an upstream service to a downstream service, total latency, wait time, and self-latency. Later, call graph data may be read to perform one or more analysis operations, described in more detail below. Additionally or alternatively, regardless of how call graph data is stored (e.g., in a database, file, or other persistent storage mechanism), call graph data may be read to generate a set of nodes and edges of a call graph in volatile memory, which nodes and edges are read in order to perform the one or more analysis operations.

Generating a Service Call Graph

A call graph may be generated in one of multiple ways. In an embodiment, when a first service calls a second service, the first service creates trace data that includes a service ID, a timestamp, a page key, and a trace ID. The service ID is a unique identifier that identifies the service that creates the trace data. The timestamp (referred to herein as the "start call timestamp") indicates when the call to the second service was made. The page key is an identifier that identifies a web application that initiated the call to the first service.

The trace ID uniquely identifies this current trace from other traces. A trace corresponds to (1) a single client request, (2) the set of services that are used as a result of processing the client request; and (3) the calls that were made by each service in the set as a result of processing the client request. Thus, each client request may be uniquely identified by a trace ID.

If the service that creates the trace data is called by another service, then the trace data may also identify that other service. For example, if service A calls service B, then trace data created by service B includes data that identifies service A. Trace data may also indicate which API was used to make the call. For example, service A calls service B using API_1. Service B creates trace data that identifies API_1. Additionally, service A may create trace data that identifies API_1 and that includes a start call timestamp.

If the first service that generates the trace data is not the root service (but rather is a downstream service), then some of the trace data (such as page key and trace ID) may be received from an upstream service.

When a first service receives, from a second service, a response to a call, then the first service updates the trace data (or generates new trace data) to include a timestamp of when the first service received the response. This timestamp is referred to herein as the "end call timestamp." The difference between the start call timestamp and the end call timestamp (associated with the same API) is the "wait time," described previously.

Alternatively, instead of updating existing trace data, the first service may have caused the trace data (that was created when the call was originally made) to be stored persistently or sent on a message bus to be retrieved and processed by another component, such as a call graph generator or a trace identifier. Thus, when the first service receives, from the second service, a response to the call, then the first service creates additional trace data that includes an end call timestamp, a page key, and a trace ID (and, optionally, a service ID and/or an API name/ID that uniquely identifies the specific API call).

After multiple instances of trace data of a single trace are stored, the multiple instances may be combined to generate a call graph from a single trace. This may be accomplished by identifying all trace data items that have the same trace ID. Then, a call graph may be created by associating each calling service to the service(s) that the calling service called. Thus, a single call graph may be created from a single trace. The call graph is associated with the page key of the trace.

Additionally, time data may be associated with one or more services in a call graph or with one or more APIs that were used. For example, service A makes a call to service B using API_1 at timestamp T1. Service A receives, from service B, a response to the call at timestamp T2. The response is correlated to the call using a trace ID and the identities of the caller (i.e., service A) and the callee (i.e., service B). A wait time for API_1 is then calculated based on the two timestamps.

As another example, service B creates a timestamp T3 when it receives a call from service A. Service B also creates a timestamp T4 when it sends, to service A, a response to the call. A total latency for service B may then be calculated by subtracting T3 from T4. Additionally or alternatively, the total latency may be associated with the API call that service A made to service B.

Continuing with the above example, if a wait time and a total latency were calculated for service B, then a self-latency may also be calculated for service B. Self-latency may be calculated by subtracting the wait time from the total latency.

Service Call Graph: Multiple Traces

An existing call graph may be updated by analyzing trace data of additional traces that share the same page key. One or more other traces associated with the same page key may have involved different paths through the same services (as the first or "initial" trace) or through a different set of services. Thus, based on additional traces, a call graph may expand by adding one or more services. Additionally, a call graph may be updated to include information about one or more additional calls. For example, initially, a call graph indicates that a first service makes a single call to a second service. After updating the call graph based on another trace, the call graph indicates that the first service makes two calls to the second service (whether using the same API or two different APIs). As a related example, after updating the call graph based on another trace, the call graph indicates that the first service makes a second call to a third service that is different than the second service.

If data from multiple traces are combined into a single call graph, then the time data (which is indicated on a per API basis) may be aggregated in one or more ways. For example, the total latency associated with a particular service in one trace may be averaged with the total latency associated with the particular service in another trace. As another example, the median of multiple wait times of a particular service from multiple traces is determined and associated with the particular service in a call graph.

In an embodiment, multiple call graphs are generated that are associated with the same page key. In other words, multiple call graphs are associated with the same web application. For example, one call graph for page A is created based on traces that occurred over a fifteen minute period of time and another call graph for page A is created based on traces that occurred over a subsequent fifteen minute period of time. As another example, one call graph for web application A is created based on traces that occurred on a particular holiday and another call graph for web application A is created based on traces that occurred on a work day that was not a holiday. Such call graphs may be compared as part of analyzing the performance of various services that are identified in the call graphs.

In an embodiment, multiple call graphs are combined to create a single call graph. For example, one call graph that is based on traces that occurred during a particular Monday is combines with a call graph that is based on traces that occurred during the subsequent day. Some metrics, such as total latency or self-latency, may be aggregated to produce a new average or a new median. As another example, if call graphs are generated on a per day basis, then all the call graphs for a particular month may be combined to generate a single call graph for the month.

When combining call graphs of different time periods, values (such as self-latency values) from one call graph may be weighted higher than values from another call graph. For example, a first call graph may be generated based on 2,000 traces while a second call graph may be generated based on 1,000 traces. In this example, values from the first call graph may be weighted twice as much as values from the second call graph. While this example uses the relative difference between trace number as the weight factor, one or more additional or alternative weight factors may be used, such as "age" of the call graphs. For example, values from a more recent call graph may be weighted higher than values than a relatively older call graph.

Performance Analysis

With one or more call graphs, different analyses may be performed. For example, given a web application, one or more service(s) may be identified as source(s) of delay. Performance analysis may be triggered based on user input. For example, an administrator may specify a particular web application to analyze. Alternatively, performance analysis may be triggered automatically, such as every hour, where a list of top N web applications is displayed. Web applications may be ranked based on one or more criteria, such as total latency, most popular web applications, and/or how long the web applications have been "live" (i.e., available to end-users).

Regardless of how a web application is initially identified (whether manually or automatically), in an embodiment, a list of web applications is displayed to a user. The list may indicate, for each web application, a count of how many times the web application was requested or invoked based on client requests and an average latency of the web application. Selection of a web application in the list may cause a summary view of multiple services (relied upon by the web application) to be generated for display.

A summary view indicates at least some of the services on which the corresponding web application relies and one or more metrics, such as an average latency of each service or group of services. In the summary view, some services may be grouped by type or other criteria. Thus, a single label in the summary view may correspond to multiple services on which the corresponding web application relies. Such groups may be referred to as "containers." For example, multiple depended services of a particular web application may be related to providing profile data to an end user. Statistics for such "profile" services are combined into a single container referred to, in the summary view, as "Profile Services." The following is an example summary view.

| Container | Call Count | Average Self-Latency (ms) |
| --- | --- | --- |
| profile-services | 10.2M | 12.1 |
| cloud-session | 15.7M | 8.8 |

Summary View

Selection of a container name may show, for example, individual data about each service that was grouped in the container, such as average latency of each service and an invocation count of each service.

In an embodiment, a call graph view is generated and displayed on a computer screen. A call graph view shows a service call graph on a per API call basis from initial page view to each downstream service. The call graph view allows developers to assess, in granular detail, the services and APIs upon which the developers' applications depend and, optionally, how those services perform. A call graph view may highlight issues downstream of which developers are not aware, such as slow backend storage.

| Path Name | Count | Total Latency | Self-Latency | Parallel? |
| --- | --- | --- | --- | --- |
| Service_A API_1 | 60.7K | 124.19 | 19.12 | Yes |
| Service_B API_2 | 71.6K | 83.18 | 20.45 | Yes |
| Service_C API_3 | 60.1K | 36.37 | 7.10 | Yes |
| Service_G API_7 | 60.1K | 29.27 | 29.27 | No |
| Service_D API_4 | 76.3K | 12.21 | 3.26 | Yes |
| Service_E API_5 | 120K | 6.61 | 1.64 | Yes |
| Service_F API_6 | 110K | 5.35 | 5.26 | Yes |

Call Path View

This example call path view indicates performance metrics for multiple services that are called as a result of multiple client requests of a particular web application, in an embodiment. The example call path view includes columns for path name, count, average latency, self-latency, and a parallel determination.

The first row of this example table indicates that Service_A was called using API "API_1" over sixty thousand times, that the average latency of that service was 124.19 milliseconds, that the self-latency of that service was 19.12 milliseconds, and that the API call "API_1" was called in parallel with another "sibling" call.

The example table also indicates that service Service_B made at least four calls: API_3 to Service_C; API_4 to Service_D; API_5 to Service_E; and API_6 to Service_F.

As noted previously, a service may make numerous API calls to other services. In an embodiment, the API calls that a particular service makes (or the services that the particular service calls) are ranked in the call graph view based on one or more criteria, such as count, total average latency, or self-latency. In the above example, the API call "API_3" made to Service_C is ranked higher than its sibling calls because API_3 to Service_C is associated with the highest average latency.

The above example indicates that the slowest service in terms of self-latency is Service_G (i.e., 29.29 milliseconds) when API_7 is called.

Root Cause Analysis

Manually determining a root cause of performance issues in a website (especially one that experiences a significant amount of traffic) is extremely difficult. In an embodiment, service call graphs are used to identify and locate potential causes of performance issues. The cause or source of a performance slowdown (or performance speed up) may be a particular service and/or a particular API.

Root cause analysis may be initiated in response to user input. For example, a user may provide input that indicates a page key or other identification data that identifies a particular web application, such as a particular URL. The user may also specify other criteria, such as a single point in time (e.g., "3 PM Eastern on Nov. 11, 2014"), multiple points in time, a single period of time, or multiple periods of time. Based on the user input, a root cause analyzer identifies at least two different call graphs that share the same page key (that identifies a web application) but that are generated based on traces that occurred over different time periods. For example, one call graph is generated based on traces that occurred over the most recent fifteen minutes while another call graph was generated based on traces that occurred over a fifteen minute period that precedes the most recent fifteen minutes.

Alternatively, root cause analysis may be initiated automatically. For example, certain web applications may be analyzed every four hours or every day to determine whether there is any degradation in service or to discover the source of the degradation in service. The web applications may be identified based on user input or may be automatically determined based on frequency of use of the web applications or some other criterion. As another example, it is automatically discovered that page load times for a particular web application has increased 200% over the past 24 hours. This determination may trigger analyzing (1) one call graph that is based on traces that occurred prior to the beginning of the 24 hour period relative to (2) another call graph that is based on traces that occurred most recently.

In an embodiment, analyzing two call graphs involves comparing two call graphs. For example, the total latency of a particular API call in one call graph is compared to the total latency of the particular API call in another call graph. If the particular API call is indicated multiple times in each call graph, then two instances in the different call graphs are determined based on their respective call paths. For example, an API call may be indicated twice in a call graph: once at a second-level service and a second time at a fourth-level service. In this example, the call path of the second-level service cannot match the call path of the fourth-level service.

Additionally or alternatively to total latency, other metrics associated with APIs may be compared. For example, the self-latency of an API call in one call graph is compared to the self-latency of the API call in another call graph (i.e., that is associated with the same page key as the first call graph).

In an embodiment, differences in metrics are computed and stored. An example difference metric is percentage change. For example, if API_1 has a self-latency of 29 milliseconds in one call graph but has a self-latency of 97 milliseconds in another call graph, then (97−29)/29=234% change. Another example metric difference is total change. In this API_1 example, the total change is 97 −29=68 milliseconds.

One or more criteria may be used to identify potential sources of negative (or positive) performance issues. One example criterion is identifying percentage changes that are over a certain threshold, such as +/−50%. Another example criterion is identifying total changes that are over a certain threshold, such as +/−80 milliseconds. Thus, even though, for example, a self-latency of a first service increased 300% and the self-latency of a second service increased only 40%, the second service may be identified as the root cause of a performance issue because the total change of the self-latency of the second service was 90 milliseconds (while the total change of the self-latency of the first service was 6 milliseconds (e.g., 3 milliseconds to 9 milliseconds)).

Example Root Cause Analysis Process

Figure 2A:
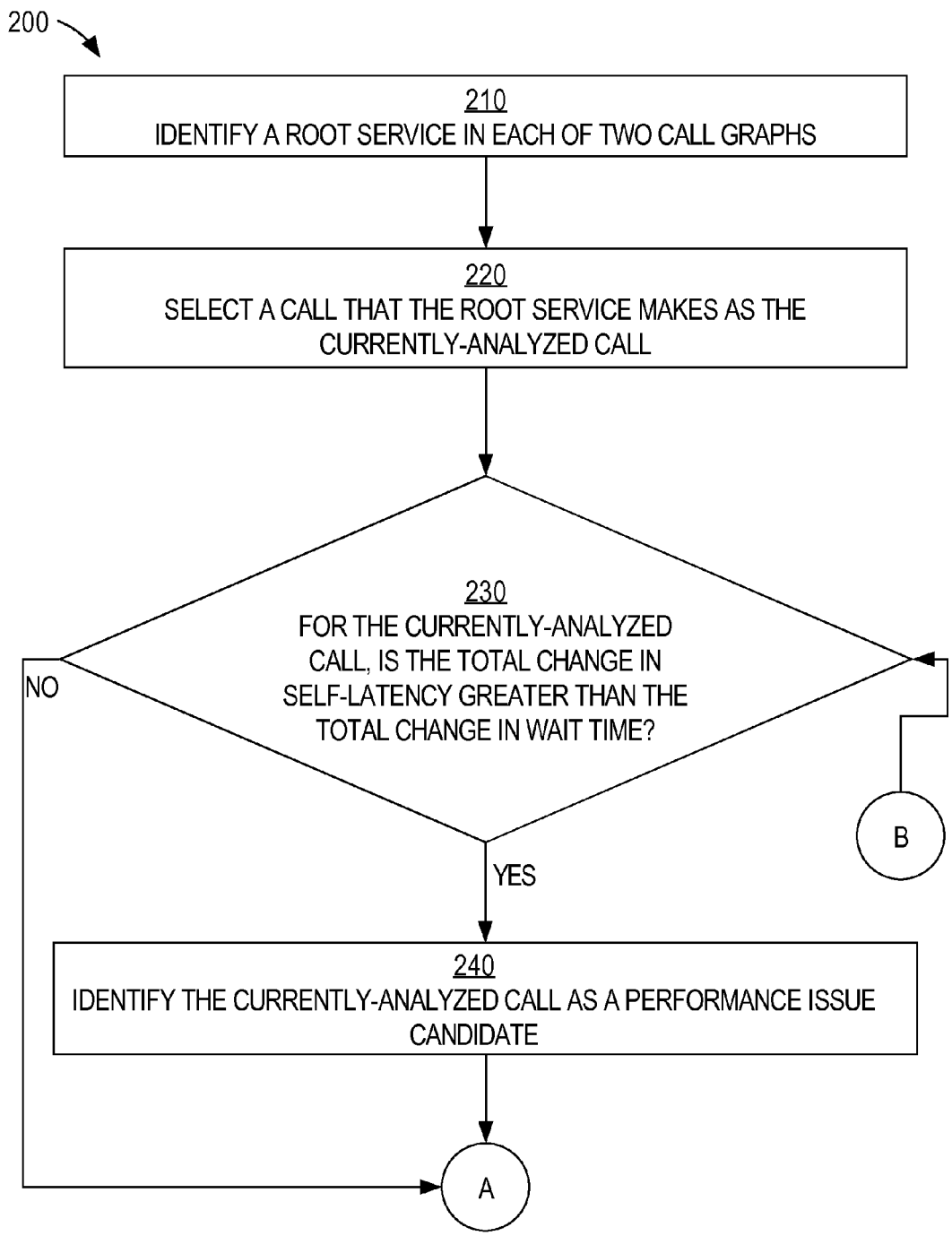
FIGS. 2A-2B are flow diagrams that depict a process for automatically identifying a root cause of a performance issue, in an embodiment.
Figure 2B:
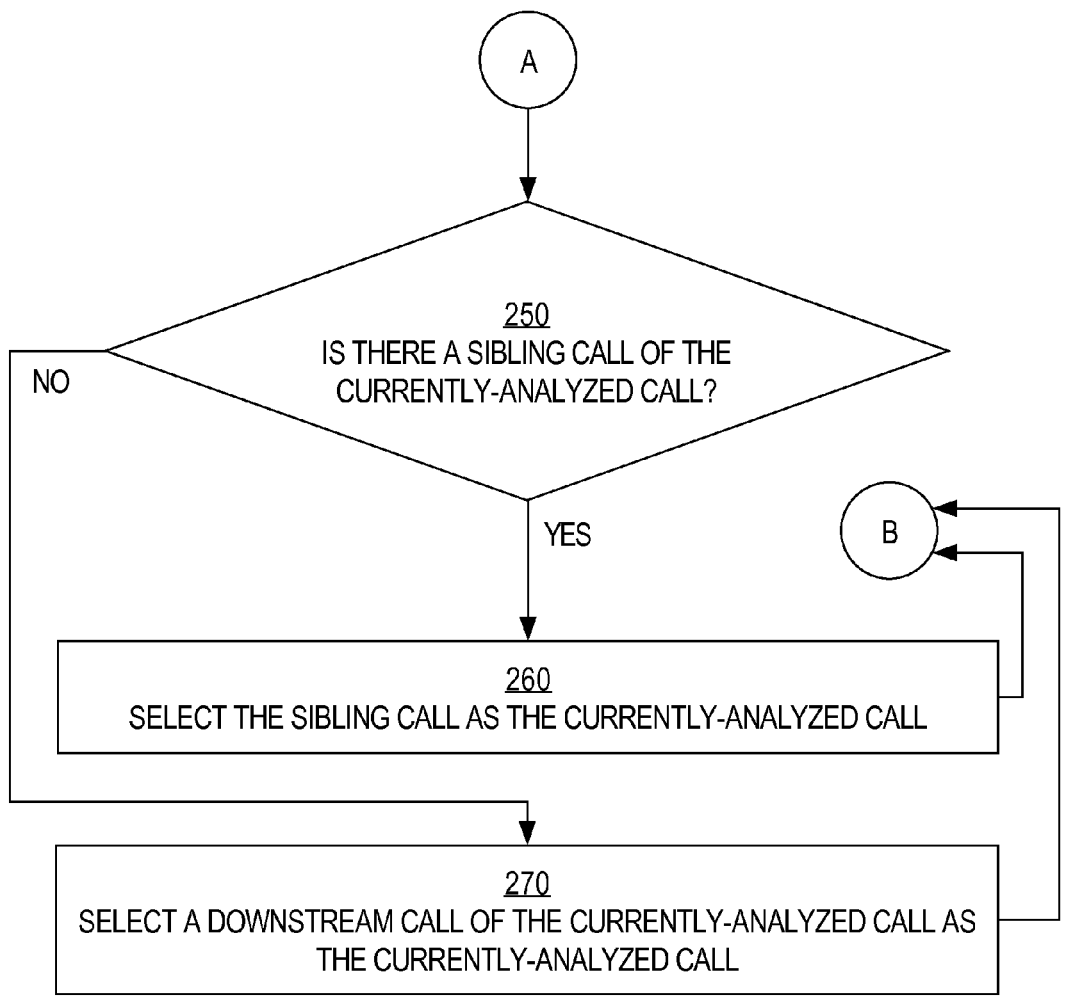

FIGS. 2A-2B are flow diagrams that depict a process 200 for automatically identifying a root cause of a performance issue, in an embodiment. Process 200 is preceded by a comparison between two call graphs and storing difference metric information in association with each API call indicated in both call graphs.

At block 210, the root service in the two call graphs is identified.

At block 220, an API call that the root service makes is selected as the currently-analyzed API call.

At block 230, it is determined whether the total change in self-latency of the currently-analyzed API call is greater than the total change in wait time associated with that API call. The wait time corresponds to the latency of downstream calls of the currently-analyzed API call. If the change in self-latency of the currently-analyzed API call is higher, then the API call is mainly responsible for the performance change and process 200 proceeds to block 240. Otherwise, process 200 proceeds to block 250.

At block 240, the currently-analyzed API call is identified as a performance issue candidate. Block 240 may involve storing candidate data that identifies the API, the call graph, the corresponding web application, and/or the total change in self-latency of the API. Block 240 may also involve displaying the candidate data on a computer screen to allow a user (e.g., a website administrator) to view the identified source of the performance issue and take any corrective actions that the user deems necessary.

At block 250, it is determined whether there is a sibling API call of the currently-analyzed API call. For example, if the root service makes two API calls (whether to the same downstream service or to different downstream services), then (during the first performance of block 250), the currently-analyzed API call will have a sibling API call. If so, then process 200 proceeds to block 260. Otherwise, process 200 proceeds to block 270.

At block 260, a sibling API call is selected as the currently-analyzed API call. Process 200 returns to block 230.

At block 270, a downstream API call of the currently-analyzed API call is selected as the currently-analyzed API call. For example, in call graph 100, after an API call from service A to service B is analyzed, an API call from service A to service C is selected. Process 200 returns to block 230.

The following are example metrics that may be analyzed during process 200.

| Path Name | Count | Total Latency | Self-Latency |
|---|---|---|---|
| Service A GET /entry | 33.4K/+53.87% | 24.4/+73.93% | 5.69/+70.8% |
| Service B read <action> | 66.8K/+53.87% | 11.2/+90.98 | 0.39/+56.91% |
| Service D GET /info | 66.8K/+53.87% | 11.46/+97.8% | 11.46/+97.8% |

The first row indicates that Service A is called using API "GET /entry" and that the difference (between a first period of time and a second period of time) in the number of times that API "GET /entry" was called is 33,400. The first row also indicates that the average latency difference for API "GET /entry" is 24.4 milliseconds while the self-latency difference of that API is only 5.69 milliseconds. Thus, it can be inferred that the performance problem is downstream relative to API "GET /entry." Traversing down the call path, the next downstream API call is "read<action>" to Service B. The latency difference at this level is 11.2 milliseconds while the self-latency difference at this level is only 0.39 milliseconds. Thus, the next API call is examined, which is "GET /info" to Service D. At this level, the entire increase in total latency is due to the increase in self-latency. Therefore, the performance issue is at Service D. Examining an application log of Service D may indicate that the root cause was maxed out database sessions. This use case shows how automatic root cause analysis using call graphs may assist developers in quickly identifying a service that is a cause of a performance issue. Further detailed analysis of the identified service can then point to the root cause.

Capacity Planning

In an embodiment, call graphs are used in capacity planning. Capacity planning involves determining whether current hardware resources may support an increase in user traffic. For example, it is determined whether there is sufficient CPU and/or memory to support an increase of user requests of web application X by 40%. One approach for capacity planning would be to identify, using a call graph associated with a particular web application, all depended services of the particular web application and then increase the capacity of each server (e.g., through CPU or memory resources) that supports one of the depended services by 40% (or purchasing 40% more servers). A downside of this approach is that a particular depended service of the particular web application may be a depended service of one or more other web applications, each of which may use the particular service more than the particular web application. Therefore, increasing the capacity of each server or purchasing additional servers in this way may result in over provisioning and, thus, idle computing resources.

Figure 3A:
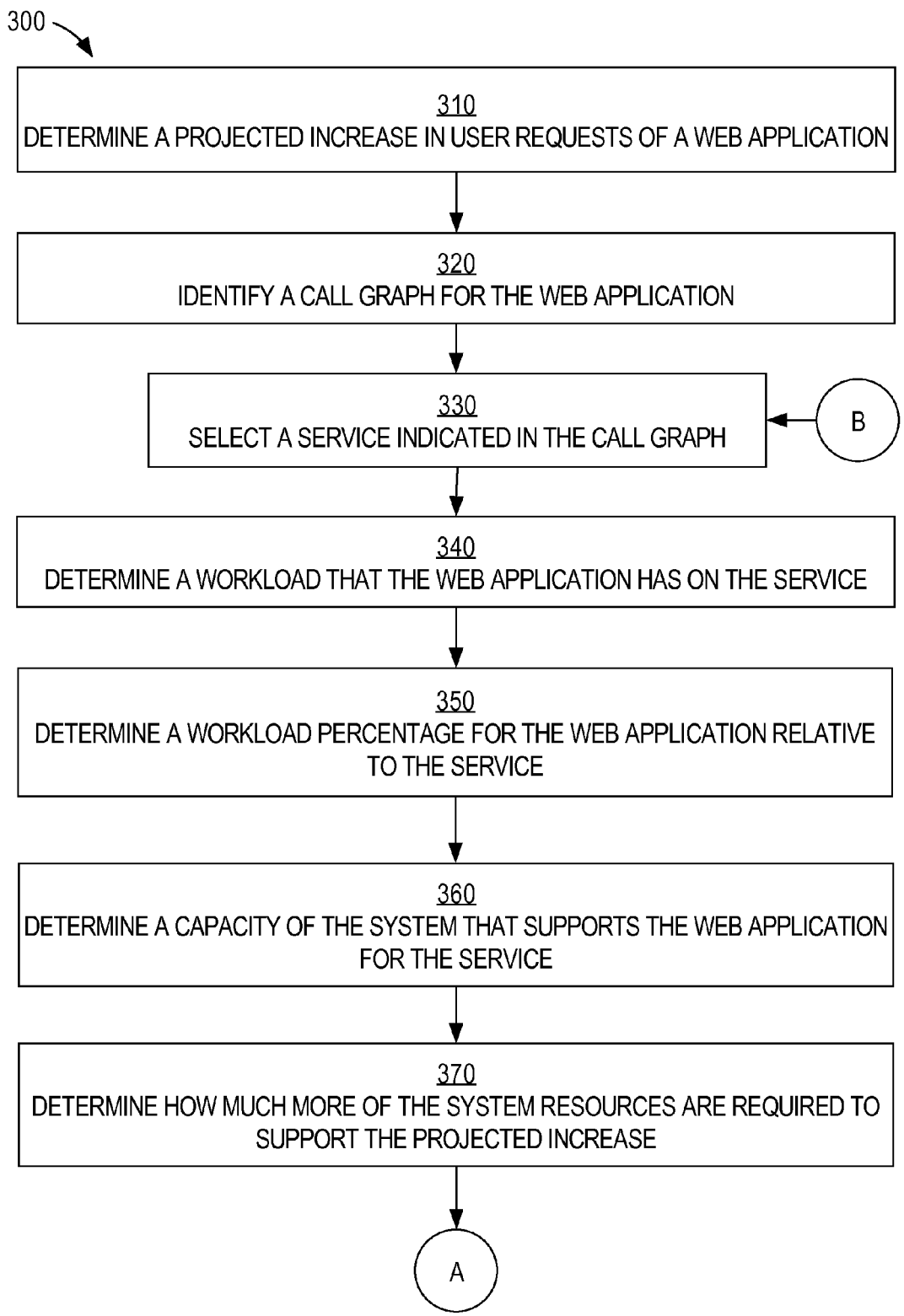
FIGS. 3A-3B are flow diagrams that depict a process for performing a capacity planning operation, in an embodiment.
Figure 3B:
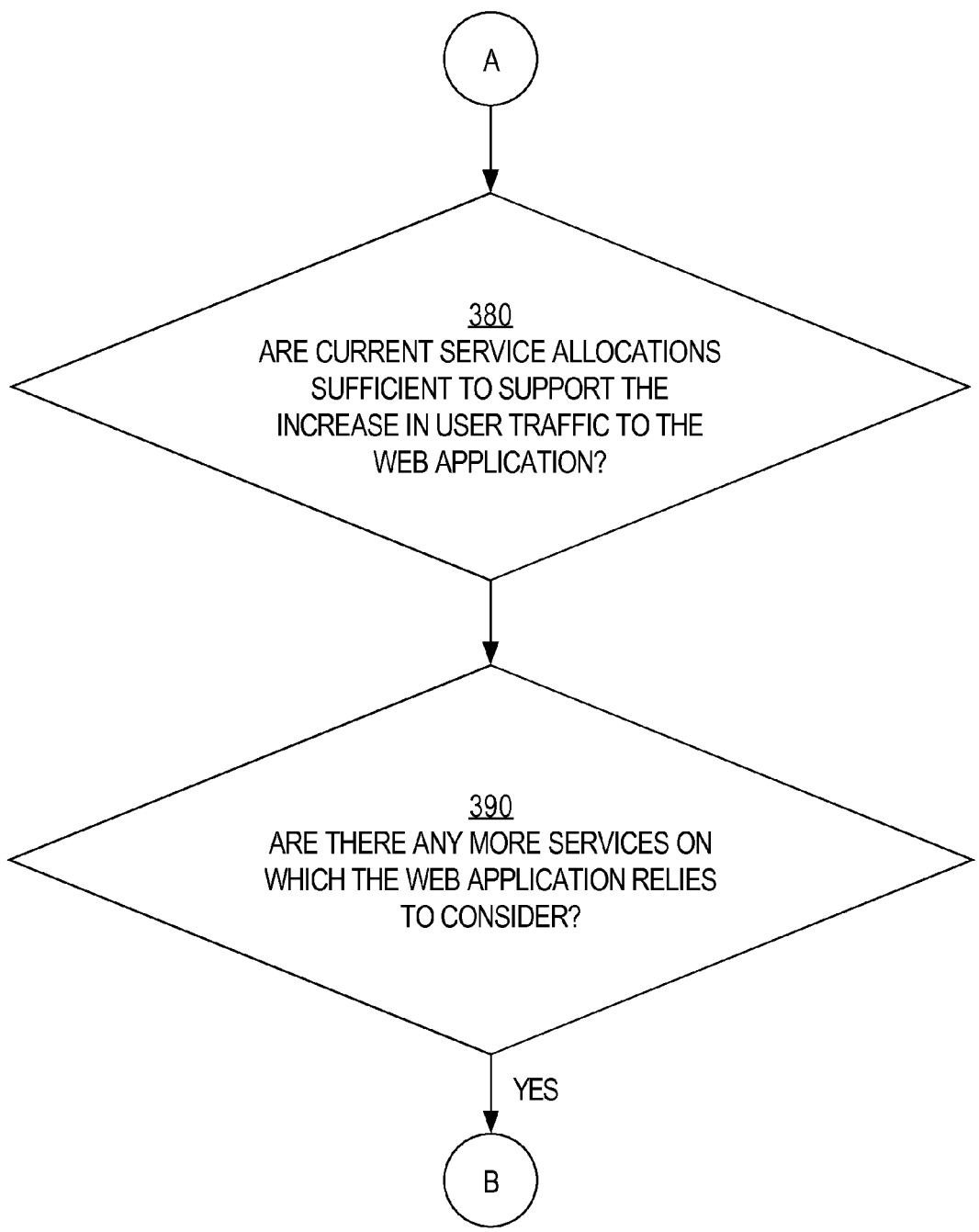

FIGS. 3A-3B are flow diagrams that depict a process 300 for performing a capacity planning operation, in an embodiment. Process 300 may be implemented in software, hardware, or a combination of software and hardware.

At block 310, a projected increase in user requests of a particular web application is determined. This determination may be made automatically or manually by a user viewing a request history of the particular web application. For example, the average increase of user traffic to the particular web application has increased 40% each year for the last five years. An automatic process may analyze request history for the particular web application and make the above determination.

At block 320, a call graph for the particular web application is identified. The particular web application is associated with a page key that is unique relative to page keys of other web applications hosted by the same web site. If a user enters a URL (or other name) for the particular web application, then a process may look up the corresponding page key in a mapping of URLs (or names) to page keys. The process then identifies, in memory or persistent storage, a call graph that is associated with the identified page key.

At block 330, a service indicated in the call graph (identified in block 320) is selected. Block 330 may involve selecting the root service (if this is the first performance of block 330), randomly selecting one of the services in the call graph, or automatically selecting the service based on one or more criteria, such as highest average latency, highest call count, or highest average wait time.

At block 340, the workload that the particular web application has on the service (identified in block 330) is determined. This workload may be determined by multiplying (1) a count of the number of times an API call to the service is made in a certain period of time (as indicated, for example, by the call graph) by (2) a self-latency of the service. If there are multiple API calls to the service (as indicated, for example, in the call graph), then the product of (1) and (2) is determined for each API call to the service and a sum of the products is calculated.

For example, if (a) $API_1$ to the service is made 2,000 times (i.e., when the particular web application is requested) and the average self-latency is 20 milliseconds and (b) $API_2$ to the service is made 1,000 times (i.e., when the particular web application is requested) and the average self-latency is 30 milliseconds, then the workload that the particular web application has on the service is (2000*20 ms)+(1000+30 ms)=40+30=70.

At block 350, a workload percentage is determined for the particular web application relative to the service. This workload percentage reflects how much of all the workload of the service is due to the particular web application. For example, it may be determined that 65% of the usage of the service (identified in block 330) is by the particular web application (while 35% of the usage of the service is by one or more other web applications). An equation that may be used to calculate this workload percentage is as follows: WPT %=$WPT_{WL}/(WPT_{WL}+WP1_{WL}+ \ldots +WPN_{WL})$, where WPT is the particular web application (identified in block 310), WPT % is the percentage of the total use of the service for which the particular web application is responsible, $WPT_{WL}$ is the workload of the service in the context of (or when used by) the particular web application, $WP1_{WL}$ is the workload of the service in the context of web application 1 (i.e., that is different than the particular web application), and $WPN_{WL}$ is the workload of the service in the context of web application N (i.e., that is different than the particular web application).

At block 360, a capacity of the system that supports the particular web application is determined for the service. For example, it may be determined that the service is using 70% of system resources (e.g., CPU) that are dedicated to the service. In the above two examples, the current use of the service by the particular web application is 70%*65%=45.5%. In other words, 45.5% of the system resources (that are dedicated to the service) that are being used by the service are due to the reliance of the particular web application on the service.

At block 370, it is determined how much more of the system resources are required to support the increase in the user traffic to the particular web application. This determined value is referred to as the "service usage increase projection." In the above example, it is projected that user traffic to the particular web application will increase 40%. Therefore, block 370 would involve multiplying 40% by the percentage calculated in block 360 (which percentage reflects the percentage of resources that are being used by the service due to reliance of the particular web application on the service). Thus, 40%*45.5%=18.2%.

At block 380, it is determined whether current service allocations are sufficient to support the projected increase in user traffic to the particular web application (determined in block C10). Block 380 may be based on the service usage increase projection determined in block C70. In a first technique, the service usage increase projection is compared to the current available capacity for the service. If the service usage increase projection is less than the current available capacity for the service, then no changes in capacity for the service are required. For example, the service usage increase projection may be 18.2% (in the previous example) and the current available CPU capacity for the service may be 30%. Therefore, current service allocations for the service (identified in block 330) are sufficient to support the projected increase of 40% in user traffic to the particular web application.

In a second technique, the service usage increase projection is compared to the "remaining capacity percentage" for the particular web application. In the above examples, there is 30% available CPU for the service (identified in 330) and the workload percentage of the particular web application relative to the service is 65%. The remaining capacity percentage of the particular web application is, thus, 30%*65%=19.5%. Because 18.2% (i.e., the calculated service usage increase projection) is less than the remaining capacity percentage for the particular web application, then current service allocations are sufficient to support the projected increase in traffic to the particular web application.

If the determination in block 380 is a negative, then report data may be generated that indicates that current service allocations are not sufficient. The report data may indicate the types of service allocations are needed (e.g., memory, CPU, network resources, etc.) and, optionally, how much is needed. Regardless of whether the determination in block 380 is an affirmative or a negative, process 300 may proceed to block 390.

At block 390, it is determined whether there are any more services relied upon by the particular web application to consider. If so, then process 300 returns to block 330. In an embodiment, all the services indicated in the call graph are eventually identified and a determination (in block 380) is performed.

In a related embodiment, blocks 340-380 of process 300 are performed for a service only after determining that there is no rated measure for the service. For example, the system that hosts a service (identified in block 330) may be rated to support five hundred queries per second ("qps") to the particular web application. If the current qps for the service is four hundred qps, then the system is able to support a 25% increase (500 qps–400 qps/400 qps) in traffic to the particular web application. In this example, because 25% is less than 40%, then system capacity will need to increase in order to support a 40% increase of traffic to the particular web application. If rated measure data does not exist for a service, then blocks 340-380 are performed for that service.

Blocks 330-380 may be repeated for each service that the particular web application (determined in block 310) relies. Thus, multiple services may be identified for which it is determined that there is insufficient available system resources to support a projected increase in traffic to the particular web application. Such services are referred to herein as "busy" services. Process 300 may cease after one busy service is identified, after a threshold number of busy services is identified, or after all busy services in the corresponding call graph are identified.

Per API Cost

In various circumstances, it may be desirable to compute a cost (in dollars or other currency) of an API, a service, or a web application. Such a cost may be useful in (a) determining the most expensive services or the most expensive (currently-deployed) web applications or (b) estimating a cost of a new application (that has not yet been deployed). The cost of a service and the cost of a web application may rely on determining a cost on a per-API basis.

For example, Service A may be called using two APIs: API_1 and API_2. API_1 has been called 3,000 times in a certain time period and has an average latency of two milliseconds during that time period. API_2 has been called 1,000 times in that time period and has an average latency of ten milliseconds during that time period. Therefore, the percentage use of API_1 is (3000*2)/(3000*2+1000*10) =37.5%.

After the percentage use of an API is calculated, a cost of the API is calculated. In this example, in order to calculate the cost of API_1, the percentage use of API_1 is multiplied by a service cost. For example, if the service cost of Service A is $100, then the cost of API_1 is $37.5. The service cost comes from the cost of servers distributed to services sharing the same server. Distribution is based on resource usage of services (e.g., CPU, memory, storage, and/or network resources). Per service, the cost is then distributed to the APIs based on count and average latency of API.

In a related embodiment, the service cost of a particular service reflects a cost of one or more downstream services of the particular service. For example, if Service A relies on Services C and D, then a cost of Service C and a cost of Service D may be determined using the above process where a percentage use of each API call to each of Services C and D is calculated. Then, the cost of Services C and D are included in the cost of Service A, which cost is used to calculate the cost of API_1 of Service A. For example, if the service cost of Service A is $100, $50 of that $100 may be due to Service C and $32 of that $100 may be due to Service D.

After calculated the cost of an API (e.g., API_1), a cost of the API per call is calculated. In this example, in order to calculate the cost of API_1 per call, the cost of API_1 is divided by the count of API_1 (i.e., 3,000 in this example). Thus, the cost of API_1 per call is $37.5/3,000=$0.0125.

After calculating the cost of each API per call of a new web application, then a total estimated cost of the new web application may be calculated. For example, in the example above where a new web application makes two calls of API_1 of Service A, makes four calls of API_2 of Service A, and makes one call of API_3 of Service F, and where the cost per call of API_1 is $0.0125, the cost per call of API_2 is $0.0625, and the cost per call of API_3 is $0.048, then an estimated cost of the new web application (per client request) is (2*$0.0125)+(4*$0.625)+(1*$0.048)=$0.323.

Cost of an Existing Web Application

As described previously, a call graph may represent information about a single web application over a period of time. In an embodiment, a call graph is used to calculate a cost (in dollars or other currency) of the corresponding web application. A cost of a web application may be calculated using self-latency of each API call to the web application's depended services, which are identified in the web application's call graph. Different metrics used to calculate a cost of a web application are as follows.

A weighted workload (W1) of a web application (PK) relative to a particular service equals the product of the number of API calls (that are associated with the web application) and an average self-latency of each API call.

A total weighted workload (W) of the particular service equals the sum of all weighted workloads (e.g., W1, W2, etc.) of all (or at least multiple) web applications on the particular service.

A percentage workload ("W %") of a web application relative to the particular service equals the weighted workload (W1) of the web application divided by the total weighted workload (W) of the web application.

Cost of a web application equals the product of the percentage workload of the web application (W %) and a particular dollar (or other currency) amount ($), which may be calculated by a mapping of services to servers and a mapping of servers to dollar amounts, which may reflect the cost of hardware, capital expenditures, and/or operation expenditures for each server. The cost of hardware may be depreciated over 36 months.

In a simple example of N1 calls of API_1 of Service A when the associated web application is PK1 and N2 calls of API_2 of Service A when the associated web application is PK2, the above metrics may be calculated as follows to determine a cost of a particular web application with respect to a particular service.

A weighted workload of $PK1$:
$W1=N1*aveSelfLatencyAPI\_1$.

A weighted workload of $PK2$:
$W2=N2*aveSelfLatencyAPI\_2$.

Total weighted workload of Service $A$: $W=W1+W2$.

$W$ % of $PK1$ at Service $A=W1/W$.

$W$ % of $PK2$ at Service $A=W2/W$.

Cost of $PK1$ at Service $A=\$*W1/W$.

Cost of $PK2$ at Service $A=\$*W2/W$.

The beginning of the above process assumes that there is only one API that a web application (e.g., PK1) uses to call Service A. However, in some scenarios, a web application makes different API calls to Service A in a single trace. For example, PK1 may make N3 calls of API_3 to Service A. Then, the weighted workload of PK1 (W1) would be N1*aveSelfLatencyAPI_1+N3*aveSelfLatencyAPI_3. The rest of the above process (i.e., calculating the total weighted workload, the workload percentage, and cost of a web application with respect to a particular service) is followed.

Once a cost of a web application with respect to a particular service is calculated, then a total dollar cost of the web application may be calculated by summing the cost of the web application with respect to each of the web application's depended services. For example, if the depended services of a web application are Services A-E, then the total cost of the web application is determined as follows: Cost of PK1 at Service A+Cost of PK1 at Service B+Cost of PK1 at Service C+Cost of PK1 at Service D+Cost of PK1 at Service E.

New Application Planning

A developer may desire to find out what impact a new web application might have if deployed and made publicly available on a web site. However, the developer may only know the services that the new web application will directly call. In other words, the developer may not know any of the services upon which the new web application indirectly relies. Thus, new application planning may involve only considering the services that the new web application directly calls. Determining an impact that a new web application might have involves analyzing API specific information at the service level, wherein the API specific information is collected from call graphs of existing applications. Such information can reliably project service response time for the new web application. Such information may be formulated based on the same source from which a call graph is generated, i.e., trace data. For example, a number of times a particular API of a service called (e.g., during a particular period of time) may be tracked. Also, an average latency of multiple calls to the particular API may be determined.

Figure 4:
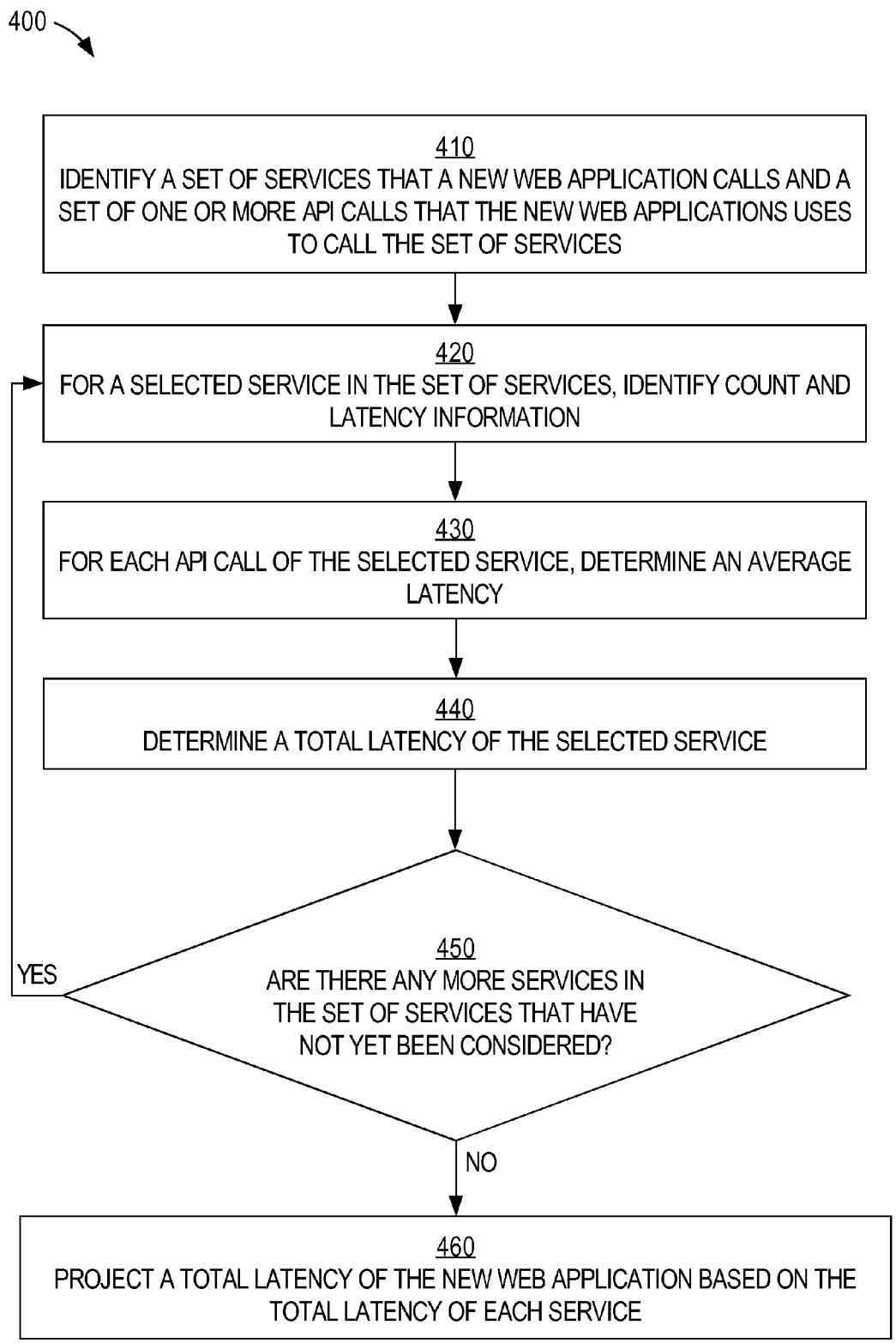
FIG. 4 is a flow diagram that depicts a process for planning for a new web application, in an embodiment.

FIG. 4 is a flow diagram that depicts a process 400 for planning for a new web application, in an embodiment. Process 400 may be implemented in software, hardware, or a combination of software and hardware.

At block 410, a set of services are identified and a set of one or more APIs that are called by a new web application to each service in the set of services is identified. For example, a developer specifies data that indicates that a new web application calls API_1 of Service A two times, API_2 of Service A four times, and API_3 of service F one time.

At block 420, for a selected service in the set of identified services, count and latency information is identified. An example of such information is found in the following table:

TABLE A

| API | Pagekey | Call Count | Avg Latency (ms) |
|---|---|---|---|
| GET /networkSizes | PK1 | 5.1M | 22.14 |
| GET /networkSizes | PK2 | 4.1M | 8.4 |
| GET /networkSizes | PK3 | 4.6M | 13.58 |
| GET /networkSizes | PK4 | 3.4M | 5.43 |
| GET /networkSizes | PK5 | 2.8M | 5.38 |
| GET /graphDistances | PK1 | 5.1M | 9.31 |
| GET /graphDistances | PK2 | 4.1M | 12.69 |

TABLE A-continued

| API | Pagekey | Call Count | Avg Latency (ms) |
|---|---|---|---|
| GET /graphDistances | PK3 | 4.5M | 11.94 |
| GET /graphDistances | PK4 | 3.4M | 4.64 |
| GET /edges/{edgesId} | PK6 | 3.2M | 5.72 |
| GET /edges/{edgesId} | None | 5.2M | 5.06 |
| GET /edges/{edgesId} | None | 4.2M | 6.18 |
| GET /edges/{edgesId} | None | 4.0M | 5.23 |
| GET /edges/{edgesId} | PK7 | 5.5M | 5.08 |
| GET /edges/{edgesId} | PK8 | 5.7M | 5.95 |

Table A lists multiple APIs of a particular service, which web applications initiate the API calls, a number of those calls on a per-web application basis, and an average latency of each API call on a per-web application basis. Thus, the API "GET /networkSizes" is called 5.1 million times when the web application associated with page key PK1 is requested and the average latency of such calls is 22.14 milliseconds.

At block 430, for each API call of the selected service (identified in block 420), an average latency is determined. For example, if Table A is of Service A and API_1 is "GET /networkSizes", then an average of the five latency times (i.e., 22.14, 8.4, 13.58, 5.43, 5.38) may be calculated. Alternatively, a median of the five latency times may be determined. Alternatively still, the maximum or minimum latency time may be selected. In the example above there the new web application calls two different APIs of Service A and API_2 is "GET /graphDistances," then an average of the four latency times (i.e., 9.31, 12.69, 11.94, and 4.64) may be calculated.

In a related embodiment, one or more latency times may be weighted prior to averaging the latency times or determining a median, maximum, or minimum of the latency times. An example weighting criterion is call count associated with each API call. For example, a first latency time that is associated with a count that is twice as high as the count of a second latency time may be weighted twice as much as the second latency time.

At block 440, a total latency of the selected service is determined. Block 440 involves, for each (e.g., average or median) latency determined in block 430 with the count information (determined in block 410) for the corresponding API call. In the initial example, the new web application calls API_1 of Service A two times and API_2 of Service A four times. If, API_1 is associated with an average latency of 9.23 milliseconds and API_2 is associated with an average latency of 8.71 milliseconds, then the total latency of Service A is (2*9.23)+(4*8.71)=53.3 milliseconds.

At block 450, it is determined whether there are any more services in the set of services (identified in block 410) that have not yet been considered. If so, then process 400 returns to block 420. Otherwise, process 400 proceeds to block 460.

At block 460, a total projected latency of the new web application is projected by summing the total latency of each service (determined in block 440) and an estimated wait time of the new web application. The estimated wait time of the new web application refers to an estimated time required for the new web application to process a client request, which time does not include the sum of the total latency of each depended service of the new web application. In the initial example, if the total latency of Service A is 53.3 milliseconds and the total latency of Service F is 16.11 milliseconds, then the total latency of the depended services is 53.3+16.11=69.41 milliseconds. If the estimate wait time of the new web application is 110 milliseconds, then the total projected latency of the new web application is 179.41 milliseconds.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

storing a service call graph that comprises a plurality of edges and a plurality of nodes;

wherein each node of the plurality of nodes corresponds to a different service of a plurality of services that are hosted by a web site and that are called as a result of processing a plurality of client requests associated with a particular web application;

wherein each edge of the plurality of edges corresponds to a call from one service of the plurality of services to another service of the plurality of services;

associating the service call graph with the particular web application;

in response to receiving a particular client request of the plurality of client requests:
    determining an application identifier that is associated with the particular web application, and
    determining a trace identifier that corresponds to the particular client request;

determining that a first service of the plurality of services is to call a second service of the plurality of services;

passing the application identifier and the trace identifier from the first service to the second service as part of the call from the first service to the second service;

generating an event for the first service that associates the first service with the application identifier and the trace identifier;

wherein the trace identifier corresponds to a set of services that are used as a result of processing the particular client request;

wherein the method is performed by one or more computing devices.

2. The method of claim 1, wherein each edge of the plurality of edges indicates which application programming interface (API) of a downstream service of said each edge was called.

3. The method of claim 1, further comprising generating the service call graph, wherein generating the service call graph comprises combining trace data that indicates a plurality of traces, wherein each trace of the plurality of traces:
corresponds to a different client request of the plurality of client requests;
indicates a particular set of services that are hosted by the web site and that were called as a result of processing a client request that corresponds to said each trace, and
includes time data of when each service in the particular set of services was called.

4. The method of claim 1, further comprising:
receiving projection data that indicates a projected increase in user traffic to a certain web application;
in response to receiving the projection data, identifying a particular service call graph that is associated with the certain web application;
for each service of one or more services indicated in the particular service call graph:
determining a percentage workload of the certain web application on said each service;
determining a remaining resource capacity for said each service;
determining, based on the percentage workload, the remaining resource capacity, and the projected increase, whether current system resources are sufficient to support the projected increase.

5. The method of claim 1, wherein:
the service call graph is based on data generated while processing multiple client requests associated with the particular web application;
the multiple client requests include the particular client request and a second client request;
processing the particular client request comprises making a first number of calls;
processing the second client request comprises making a second number of calls that is different than the first number of calls.

6. The method of claim 1, wherein the service call graph is a first service call graph that is generated based on a first set of one or more client requests, the method further comprising:
combining the first service call graph with a second service call graph that is different than the first service call graph and that is generated based on a second set of one or more client requests that is different than the first set of one or more client requests.

7. The method of claim 6, wherein combining comprises aggregating first time data associated with a first node in the first service call graph with second time data associated with a second node in the second service call graph, wherein the first node and the second node correspond to the same service in the plurality of services.

8. A method comprising:
storing a first service call graph that comprises a plurality of edges and a plurality of nodes;
wherein each node of the plurality of nodes corresponds to a different service of a plurality of services that are hosted by a web site and that are called as a result of processing a first plurality of client requests associated with a particular web application;
wherein each edge of the plurality of edges corresponds to a call from one service of the plurality of services to another service of the plurality of services;
associating the first service call graph with the particular web application;
storing a second service call graph that comprises a second plurality of edges and a second plurality of nodes and is based on a second plurality of client requests associated with the particular web application;
comparing the first service call graph with the second service call graph;
wherein the method is performed by one or more computing devices.

9. The method of claim 8, wherein:
the first service call graph is generated based on the first plurality of client requests that were processed during a first period of time;
the second service call graph is generated based on the second plurality of client requests that were processed during a second period of time that is different than the first period of time.

10. The method of claim 8, wherein comparing comprises:
comparing a first self-latency of a first node in the first service call graph with a second self-latency of a second node in the second service call graph, wherein the first node and the second node represent a first service of the plurality of services.

11. The method of claim 8, further comprising:
comparing first time or count information associated with one or more nodes in first service call graph with second time or count information associated with one or more nodes in the second service call graph.

12. A system comprising:
one or more processors;
one or more storage media storing instructions which, when executed by the one or more processors, cause:
storing a service call graph that comprises a plurality of edges and a plurality of nodes;
wherein each node of the plurality of nodes corresponds to a different service of a plurality of services that are hosted by a web site and that are called as a result of processing a plurality of client requests associated with a particular web application;
wherein each edge of the plurality of edges corresponds to a call from one service of the plurality of services to another service of the plurality of services;
associating the service call graph with the particular web application;
in response to receiving a particular client request of the plurality of client requests:
determining an application identifier that is associated with the particular web application, and
determining a trace identifier that corresponds to the particular client request;
determining that a first service of the plurality of services is to call a second service of the plurality of services;
passing the application identifier and the trace identifier from the first service to the second service as part of the call from the first service to the second service;
generating an event for the first service that associates the first service with the application identifier and the trace identifier;
wherein the trace identifier corresponds to a set of services that are used as a result of processing the particular client request.

13. The system of claim 12, wherein each edge of the plurality of edges indicates which application programming interface (API) of a downstream service of said each edge was called.

14. The system of claim 12, wherein:
the instructions, when executed by the one or more processors, further cause generating the service call graph;
generating the service call graph comprises combining trace data that indicates a plurality of traces;
each trace of the plurality of traces:
corresponds to a different client request of the plurality of client requests;
indicates a particular set of services that are hosted by the web site and that were called as a result of processing a client request that corresponds to said each trace, and
includes time data of when each service in the particular set of services was called.

15. The system of claim 12, wherein the service call graph is a first service call graph, wherein the instructions, when executed by the one or more processors, further cause:
storing a second service call graph that comprises a second plurality of edges and a second plurality of nodes and is based on a second plurality of client requests associated with the particular web application;
comparing the first service call graph with the second service call graph.

16. The system of claim 15, wherein:
the first service call graph is generated based on a first plurality of client requests that were processed during a first period of time;
the second service call graph is generated based on the second plurality of client requests that were processed during a second period of time that is different than the first period of time.

17. The system of claim 15, wherein comparing comprises:
comparing a first self-latency of a first node in the first service call graph with a second self-latency of a second node in the second service call graph, wherein the first node and the second node represent a first service of the plurality of services.

18. The system of claim 15, wherein the instructions, when executed by the one or more processors, further cause:
comparing first time or count information associated with one or more nodes in first service call graph with second time or count information associated with one or more nodes in the second service call graph.

19. The system of claim 12, wherein the instructions, when executed by the one or more processors, further cause:
receiving projection data that indicates a projected increase in user traffic to a certain web application;
in response to receiving the projection data, identifying a particular service call graph that is associated with the certain web application;
for each service of one or more services indicated in the particular service call graph:
determining a percentage workload of the certain web application on said each service;
determining a remaining resource capacity for said each service;
determining, based on the percentage workload, the remaining resource capacity, and the projected increase, whether current system resources are sufficient to support the projected increase.

20. The system of claim 12, wherein:
the service call graph is based on data generated while processing multiple client requests associated with the particular web application;
the multiple client requests include the particular client request and a second client request;
processing the particular client request comprises making a first number of calls;
processing the particular client request comprises making a second number of calls that is different than the first number of calls.

21. The system of claim 12, wherein the service call graph is a first service call graph that is generated based on a first set of one or more client requests, wherein the instructions, when executed by the one or more processors, further cause:
combining the first service call graph with a second service call graph that is different than the first service call graph and that is generated based on a second set of one or more client requests that is different than the first set of one or more client requests.

22. The system of claim 21, wherein combining comprises aggregating first time data associated with a first node in the first service call graph with second time data associated with a second node in the second service call graph, wherein the first node and the second node correspond to the same service in the plurality of services.

* * * * *